United States Patent [19]

Sasaki et al.

[11] Patent Number: 5,215,951
[45] Date of Patent: Jun. 1, 1993

[54] PROCESS FOR PRODUCING α-OLEFIN POLYMER

[75] Inventors: Toshio Sasaki; Hirofumi Jyohouji; Takeshi Ebara, all of Ichihara; Kiyoshi Kawai, Chiba, all of Japan

[73] Assignee: Sumitomo Chemical Company, Limited, Osaka, Japan

[21] Appl. No.: 729,791

[22] Filed: Jul. 10, 1991

Related U.S. Application Data

[63] Continuation of Ser. No. 262,692, Oct. 26, 1988, abandoned.

[30] Foreign Application Priority Data

Oct. 29, 1987 [JP] Japan ................. 62-274773

[51] Int. Cl.$^5$ .................. C08F 4/651; C08F 4/653; C08F 10/00
[52] U.S. Cl. ................. 502/126; 502/125; 502/127; 526/119; 526/351
[58] Field of Search .................. 502/126, 127, 128

[56] References Cited

U.S. PATENT DOCUMENTS

| | | | |
|---|---|---|---|
| 4,224,181 | 9/1980 | Langer | 526/153 |
| 4,426,315 | 1/1984 | Bahadir et al. | 526/129 |

FOREIGN PATENT DOCUMENTS

| | | |
|---|---|---|
| 16581 | 10/1980 | European Pat. Off. |
| 196585 | 10/1986 | European Pat. Off. |
| 57-102907 | 6/1982 | Japan |
| 57-102908 | 6/1982 | Japan |
| 58-138707 | 8/1983 | Japan |
| 59-206407 | 11/1984 | Japan |
| 61-218606 | 9/1986 | Japan |

Primary Examiner—Edward J. Smith
Attorney, Agent, or Firm—Stevens, Davis, Miller & Mosher

[57] ABSTRACT

A process for producing an α-olefin polymer which comprises polymerizing an α-olefin in the presence of a catalyst system comprising
(A) a solid catalyst component containing at least titanium, magnesium, halogen, and electron donor and
(B) a sterically hindered aluminum amide compound represented by the general formula

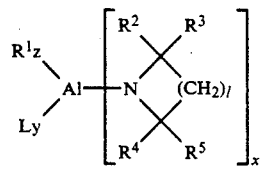

wherein, $R^1$ through $R^5$ denote each a hydrocarbon group of 1 to 20 carbon atoms, L denotes an alkoxy group of 1 to 20 carbon atoms and/or halogen, l is 2 or 3, x is defined by $0 < x < 1$, y is defined by $0 \leq y < 3$, and z is defined by $0 < z < 3$ with the proviso that $x + y + z = 3$.

18 Claims, 1 Drawing Sheet

(A) TRANSITION METAL COMPONENT (SOLID CATALYST COMPONENT)

CONTAINING AT LEAST Ti, Mg, HALOGEN, AND ELECTRON DONOR (B) ORGANOMETALLIC COMPONENT

GENERAL FORMULAR $$\left( R^1\text{-}R^5: C_1\text{-}C_{20}\,\text{HYDROCARBON RADICAL},\ L: C_1\text{-}C_{20}\,\text{ALKOXY AND/OR HALOGEN},\ \ell: 2\ \text{OR}\ 3,\ x: 0<x<1,\ y: 0\le y<3,\ z: 0<z<3,\ x+y+z=3 \right)$$

POLYMERIZATION → α-OLEFIN (CO) POLYMER

PROCESS FOR PRODUCING α-OLEFIN POLYMER

This application is a continuation of application Ser. No. 262,692, filed Oct. 26, 1988, now abandoned.

BACKGROUND OF THE INVENTION

The present invention relates to a process for producing an α-olefin polymer and more particularly to a process for producing an α-olefin polymer in the presence of a novel catalyst system having a very high catalytic activity per a unit weight of solid catalyst component as well as per a unit gram atom of titanium. The produced α-olefin polymer contains extremely-decreased amounts of catalyst residue and of amorphous polymer and is superior in mechanical properties and processability.

It is well known to use generally the so-called Ziegler-Natta catalyst that comprises a transition metal compound, said metal being selected from the metals belonging to the group IV-VI of the periodic table, and an organometallic compound, said metal being selected from the metals belonging to the group I-III of the periodic table, in processes for producing polymers of α-olefins including propylene and butene-1.

In particular, titanium trichloride catalysts are used extensively for the industrial productions of α-olefin polymers.

However, any of these processes produces incidentally an amorphous polymer besides a high-stereoregular α-olefin polymer of high industrial utility value.

The amorphous polymer is limited in industrial utility value and has adverse effects on mechanical properties of the films, fibers, and other processed articles of the α-olefin polymer when contained therein.

In addition, the formation of the amorphous polymer causes a loss of raw material monomer and simultaneously makes a facility indispensable which is necessary to remove the amorphous polymer, thus bringing about very great disadvantages from the industrial point of view.

Accordingly, if such an amorphous polymer is not formed at all or is formed in a slightest amount, it will be a very great benefit.

On the other hand, the α-olefin polymer obtained from such a polymerization process as stated above contains a catalyst residue, which raises problems in various respects such as the stability and processability of the α-olefin polymer and hence necessitates a facility for removing the catalyst residue and for stabilizing the polymer.

This drawback can be offset by increasing the catalytic activity represented by the weight of α-olefin polymer produced per a unit weight of catalyst. If this catalytic activity can be increased sufficiently, the facility to remove the catalyst residue will become unnecessary and the cost required for producing the α-olefin polymer will be reducible.

The present inventors previously proposed a process for producing an α-olefin polymer in the presence of a catalyst system comprising a solid catalyst component which contains at least titanium, magnesium, halogen, and electron donor, that is, a process employing a catalyst system consisting of (i) a solid obtained by reducing a titanium compound represented by the general formula $Ti(OR^6)_nX_{4-n}$, with an organomagnesium compound and treating the resulting solid with an ester compound and then with a mixture of an ether compound and titanium tetrachloride, (ii) an organoaluminum compound, and (iii) a silicic ester compound (JP-A-61-218606).

This process provides a highly stereoregular α-olefin polymer but has drawbacks in that the catalytic activity during polymerization lowers to a large extent and that the polymerization process is complicated since the catalyst system is composed of three components.

For the purpose of improving the stereoregularity of α-olefin polymers, there are disclosed processes employing each a catalyst system which comprises a third component in addition to a solid catalyst component containing titanium, magnesium, halogen, and electron donor and an organoaluminum co-catalyst, said third component comprises a sterically hindered amine having very weak reactivity on the organoaluminum (JP-A-55-127408, JP-A-58-138707, and JP-A-59-206407). According to these processes, however, the α-olefin polymer obtained still does not have a stereoregularity adequate to give satisfaction and also the catalytic activity is not sufficient to omit the operation step of removing the catalyst residue. Moreover, these processes have the drawback of being complicated in polymerization process since the catalyst system comprises three components.

On the other hand, processes for α-olefin polymerization are disclosed wherein two-component catalyst systems are used which consist each of an aluminum amide compound co-catalyst and a solid catalyst component containing titanium, magnesium, halogen, and electron donor.

According to an example of these processes, an α-olefin is polymerized in the presence of a two-component catalyst system comprising (i) a solid catalyst component composed of a transition metal halide such as $TiCl_4 \cdot TiCl_3$ supported by stratified crystals of $MgCl_2$ or the like and (ii) a metal amide compound represented by $R'_2YNR''_2$ wherein, R' is a $C_1$–$C_{20}$ alkyl group, R'' is a bulky $C_5$–$C_{20}$ alkyl group or forms, jointly with the neighboring nitrogen atom, a sterically hindered cyclic amino group, and Y is Al, In, or Ga (JP-A-55-127406).

According to these processes, however, the catalyst system does not have such a high activity as to permit omitting the step of removing the catalyst residue, though a high-stereoregularity α-olefin polymer can be obtained.

Under such circumstances as stated above, the problems to solve according to the present invention, in other words, an object of the present invention is to provide a process for producing an α-olefin polymer in the presence of a catalyst system which exhibits such a high activity and a stereospecificity that the removal of catalyst residue and amorphous polymer may be unnecessary.

SUMMARY OF THE INVENTION

The present invention involves a process for producing an α-olefin polymer in the presence of a catalyst system which comprises (A) a solid catalyst component containing at least titanium, magnesium, halogen, and electron donor and
(B) a sterically hindered aluminum amide compound represented by the general formula

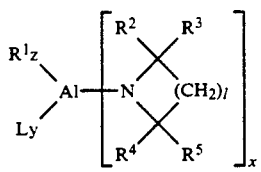

wherein, $R^1$ through $R^5$ denote each a hydrocarbyl group of 1 to 20 carbon atoms, L denotes an alkoxy group of 1 to 20 carbon atoms and/or halogen, l is 2 or 3, x is defined by $0<x<1$, y is defined by $0 \leq y<3$, and z is defined by $0<z<3$ with the proviso that $x+y+z=3$. The above and other objects can be achieved by using the present catalyst system.

DETAILED DESCRIPTION OF THE PREFERRED EMBODIMENT

Figure 1:
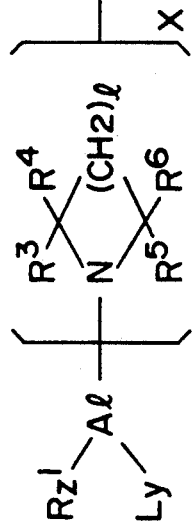
FIG. 1 is a flow chart for facilitating the understanding of the present invention. This flow chart shows a typical embodiment of the invention without implying any restriction on the invention.

Hereinafter the present invention is described in detail.

(A) Solid catalyst component

Description is given below on the solid catalyst component, used in the present invention, which contains at least titanium, magnesium, halogen, and electron donor.

(a) Titanium compound

The titanium compound contained in the solid catalyst component (A) is represented by the general formula $Ti(OR^7)_a X_b$ ($R^7$ is a hydrocarbon group of 1 to 20 carbon atoms, X is halogen, and a and b are numbers defined by $0 \leq a<4$, $0<b \leq 4$, and $a+b=3$ or 4).

Such titanium compounds include, for example, titanium trichloride, titanium tribromide, titanium triiodide, titanium tetrachloride, titanium tetrabromide, titanium tetraiodide, ethoxytitanium trichloride, butoxytitanium trichloride, ethoxytitanium tribromide, diethoxy-titanium dichloride, dibutoxytitanium dichloride, diethoxytitanium dibromide, dibutoxytitanium diiodide, triethoxytitanium chloride, tributoxytitanium chloride, tributoxytitanium iodide, triethoxytitanium iodide, phenoxytitanium trichloride, and cresoxytitanium trichloride. Of these compounds, preferred are titanium trichloride, titanium tetrachloride, ethoxytitanium trichloride, butoxytitanium trichloride, phenoxytitanium trichloride, and cresoxytitanium trichloride.

(b) Magnesium compound

The magnesium compound contained in the solid catalyst component (A) is represented by the general formula $R^8_c MgX_d$ ($R^8$ is a hydrocarbon group of 1 to 20 carbon atoms, X is halogen and/or alkoxy group, and c and d are numbers defined by $0 \leq c<2$ and $0<d \leq 2$).

Such magnesium compounds include, for example, ethylmagnesium chloride, ethylmagnesium iodide, butylmagnesium bromide, ethoxymagnesium chloride, ethoxymagnesium bromide, butoxymagnesium iodide, butoxymagnesium chloride, phenoxymagnesium chloride, phenoxymagnesium iodide, phenoxymagnesium bromide, magnesium dichloride, magnesium diiodide and magnesium dibromide. Of these compounds, preferred are magnesium dichloride, ethoxymagnesium chloride, butoxymagnesium chloride, and phenoxymagnesium chloride.

(c) Electron donor

Electron donors contained in the solid catalyst component (A) used in the present invention include monovalent or multivalent carboxylic esters, ether compounds, and silicic ester compounds. Examples of the monovalent or multivalent carboxylic esters are aliphatic carboxylic esters including methyl acetate, phenyl acetate, methyl propionate, methyl acrylate and methyl methacrylate and aromatic carboxylic esters including ethyl benzoate, butyl benzoate, methyl toluate, ethyl anisate, diethyl phthalate, diisobutyl phthalate, and diphenyl phthalate. Examples of the ether compounds are diethyl ether, diisopropyl ether, dibutyl ether, diamyl ether, diisoamyl ether, dihexyl ether, dioctyl ether, diphenyl ether, dibenzyl ether, anisol, tetrahydrofuran, and tetrahydropyrane. Examples of the silicic esters are tetramethoxysilane, dimethyldimethoxysilane, tetraethoxysilane, triethoxyethylsilane, tetraisopropoxysilane, diisopropoxydimethylsilane, tetraphenoxysilane, hexamethyldisiloxane, dimethylpolysiloxane, and methylhydropolysiloxane. Of these electron donors, preferred are aromatic carboxylic diesters such as diethyl phthalate, diisobutyl phthalate, and diphenyl phthalate.

(d) Preparation of solid catalyst component (A)

Suitable methods for preparing the solid catalyst component (A) containing at least titanium, magnesium, halogen, and electron donor are disclosed, for example, in JP-A-50-108385, JP-A-50-126590, JP-A-51-20297, JP-A-51-28189, JP-A-51-9288, JP-A-52-87489, JP-A-53-40093, JP-A-53-45688, JP-A-53-3894, JP-A-55-75411, JP-A-56-18609, JP-A-56-70005, JP-A-57-3803, JP-A-58-32605, JP-A-58-138708, JP-A-58-5309, JP-A-59-149906, JP-A-59-206415 and JP-A-61-218606.

Examples of these methods are as follows:

(i) a magnesium alkoxide is solubilized in a solvent with a titanium alkoxide, the resultant is treated with an electron donor, and brought into contact with a titanium halide.

(ii) A magnesium compound having no reducing power is ground in the presence or absence of an electron donor such as an unsaturated carboxylic ester and a pulverization auxiliary such as a silicone oil, treated preliminarily with a silicon halide or an organoaluminum compound, and reacted with a liquid titanium compound.

(iii) A magnesium halide is reacted with an electron donor having active hydrogen, e.g. alcohol or phenol, and with an electron donor having no active hydrogen, e.g. an organic acid ester, and the product is reacted with an organoaluminum compound or a silicon halide, and further reacted with a titanium compound.

(iv) A titanium compound represented by Ti-$(OR^6)_n X_{4-n}$ is reduced with an organomagnesium compound in the presence of a silicon compound having an Si-O bond, and the resulting solid is treated with an ester compound, and further treated with an ether compound and titanium tetrachloride (JP-A-61-218606).

Of these methods, preferred is the method (iv) from the viewpoint of the efficiency of the solid catalyst obtained.

This method is described below in more detail.

(a) Titanium compound

The titanium compound used in the present invention is represented by the general formula $Ti(OR^6)_nX_{4-n}$ ($R^6$ is a hydrocarbon group of 1 to 20 carbon atoms, X is halogen, and n is a number defined by $0<n\leq 4$). Examples of $R^6$ include alkyl groups such as methyl, ethyl, isopropyl, and heptyl and aryl groups such as phenyl, xylyl, and naphthyl. Of these groups, preferred are linear alkyl groups of 2 to 18 carbon atoms.

Of halogen atoms represented by X, chlorine gives favorable results in particular. The value of n is defined by $0<n\leq 4$, preferably $2\leq n\leq 4$, particularly preferably $n=4$.

(b) Organic silicon compound having Si-O bond

The organic silicon compound having Si-O bond used in the present invention is represented by the general formula $$Si(OR^9)_mR^{10}_{4-m'}$$

$$R^{11}(R^{12}_2SiO)_pSiR^{13}_3, \text{ or}$$

$$(R^{14}_2SiO)_q$$

wherein, $R^9$ is a hydrocarbon group of 1 to 20 carbon atoms, $R^{10}$, $R^{11}$, $R^{12}$, $R^{13}$, and $R^{14}$ are each a hydrocarbon group of 1 to 20 carbon atoms or hydrogen, m is a number defined by $0<m\leq 4$, p is an integer of 1 to 1000, and q is an integer of 2 to 1000.

Examples of the organic silicon compound are tetramethoxysilane, dimethyldimethoxysilane, tetraisopropoxysilane, tetrabutoxysilane, dibutoxydibutylsilane, hexamethyldisiloxane, diphenylpolysiloxane and methylhydropolysiloxane.

Of these compounds, preferred are alkoxysilane compounds represented by the general formula $Si(OR^9)_mR^{10}_{4-m}$, wherein $1\leq m\leq 4$ is preferred and $m=4$ is particularly preferred.

(c) Organomagnesium compound

Preferred organomagnesium compounds for use in the present invention are Grignard compounds represented by the general formula $R^{15}MgX$ ($R^{15}$ is a hydrocarbon group of 1 to 20 carbon atoms and X is halogen) and dialkylmagnesium compounds or diarylmagnesium compounds represented by the general formula $R^{16}R^{17}Mg$ ($R^{16}$ and $R^{17}$ are each a hydrocarbon group of 1 to 20 carbon atoms).

More specifically, the above $R^{15}$, $R^{16}$, and $R^{17}$ are the same or different and denote each alkyl, aryl, aralkyl, or alkenyl of 1 to 20 carbon atoms, such as methyl, ethyl, propyl, isopropyl, butyl, sec-butyl, tert-butyl, amyl, isoamyl, hexyl octyl, 2-ethylhexyl, phenyl, or benzyl.

Examples of the Grignard compounds include methylmagnesium chloride, ethylmagnesium chloride, ethylmagnesium bromide, isoamylmangesium chloride, phenylmagnesium chloride, and phenylmagnesium bromide. Examples of the compounds represented by $R^{16}R^{17}Mg$ include diethylmagnesium, dipropylmagnesium, diisopropylmagnesium, diamylmagnesium and diphenylmagnesium.

Suitable solvents for use in the preparation of the above organomagnesium compound include ethers such as diethyl ether and dipropyl ether. It is also possible to use a hydrocarbon such as hexane, heptane, cyclohexane, toluene, or xylene or a mixture of the above ether and hydrocarbon. In view of the catalyst efficiency, it is favorable in particular to use the Grignard compound represented by $R^{15}MgCl$ in the form of ether solution.

(d) Ester compound

Suitable ester compounds for use in the preparation of solid catalyst component (A) are monovalent or multivalent carboxylic esters including aliphatic carboxylic esters, olefincarboxylic esters, alicyclic carboxylic esters, and aromatic carboxylic esters. Examples of the suitable ester compounds are methyl acetate, ethyl acetate, phenyl acetate, ethyl benzoate, ethyl anisate, diethyl malonate, dimethyl maleate, methyl methacrylate, diisobutyl phthalate, octyl phthalate, and diphenyl phthalate.

Of these ester compounds, preferred are olefincarboxylic esters such as methacrylic esters, maleic esters and aromatic carboxylic esters such as benzoic esters and particularly preferred are phthalic esters.

(e) Ether compound

Suitable ethers for use in the preparation of the solid catalyst component (A) are dialkyl ethers including diethyl ether, dipropyl ether, diisopropyl ether, dibutyl ether, diamyl ether, and diisoamyl ether.

Of these ethers, preferred are dibutyl ether and diisoamyl ether.

(f) Preparation of solid catalyst component (A)

The solid catalyst component (A) of the present invention is prepared by reducing a titanium compound with an organomagnesium compound in the presence of an organic silicon compound, and treating the solid product obtained by reduction with an ester compound and a mixture of the ether compound and titanium tetrachloride. Preferably, the solid product obtained by reduction is treated with the ester compound and thereafter with a mixture of the ether compound and titanium tetrachloride.

The method of reduction of the titanium compound with the organomagnesium may be conducted either by adding the organomagnesium compound to a mixture of the titanium compound and the organic silicon compound or on the contrary by adding a mixture of the titanium compound and the organic silicon compound to a solution of the organomagnesium compound. The former order of addition is preferably from the viewpoint of catalytic activity.

It is preferably to use the titanium compound and the organic silicon compound with them dissolved or diluted with a suitable solvent.

Such solvents include; aliphatic hydrocarbons, e.g. hexane, heptane, octane, and decane; aromatic hydrocarbons, e.g. toluene and xylene; alicyclic hydrocarbons, e.g. cyclohexane, methylcyclohexane, and decalin; and ethers, e.g. diethyl ether, dibutyl ether, diisoamyl ether, and tetrahydrofuran.

The reduction temperature ranges from $-50°$ to $70°$ C., preferably from $-30°$ to $50°$ C., particularly preferably from $-25°$ to $35°$ C. When the reduction temperature is too high, the catalytic activity will be low.

There is no particular restriction on the period of adding the organomagnesium compound dropwise. Generally, this period is from about 30 minutes to about 6 hours. After completion of the reduction, after-reaction may be conducted at a temperature of 20° to 120° C.

As to the amount of organic silicon compound to be used, the atomic ratio of Si atoms therein to Ti atoms in the titanium compound used, that is, the Si/Ti ratio, is from 1 to 50, preferably from 3 to 30, particularly preferably from 5 to 25.

As to the amount of organomagnesium compound to be used, the atomic ratio of the sum of titanium atoms and silicon atoms to magnesium atoms in the reaction system, that is, the Ti+Si/Mg ratio, is from 0.1 to 10, preferably from 0.2 to 5.0, particularly preferably from 0.5 to 2.0.

The solid product produced by the reduction is separated from the liquid and washed several times with an inert liquid hydrocarbon such as hexane or heptane.

The thus obtained solid product contains trivalent titanium, magnesium, and hydrocarbyloxy group and is generally noncrystalline or shows a very weak crystalinity. In particularly, the noncrystalline structure is preferable in view of the catalyst efficiency.

The reduction of the titanium compound with the organomagnesium compound can also be carried out in the presence of a porous polymer or a porous oxide.

Such porous polymers or oxides include, for example, a styrene polymer, acrylonitrile polymer, vinyl chloride polymer, propylene polymer, acrylonitrile-divinylbenzene copolymer, styrene-divinylbenzene copolymer, aluminum oxide, magnesium oxide, silicon oxide, aluminum oxide-silicon oxide compound, and niobium oxide. Of these materials, preferred are a styrene-divinylbenzene copolymer and silicon oxide.

In the next place, the solid product obtained as stated above is treated with the ester compound.

The ester compound is used in an amount of 0.1 to 50 moles, preferably 0.3 to 20 moles, particularly preferably 0.1 to 10 moles, per mole of titanium atoms in the solid product.

On the other hand, the amount of the ester compound to be used per mole of magnesium atoms contained in the solid product is from 0.01 to 1.0 mole, preferably from 0.03 to 0.5 mole. Excessive use of the ester compound tends to collapse particles of the solid product.

The treatment of the solid product with the ester compound can be carried out by any of known methods such as a slurry method, ball milling and other mechanical means of size reduction which contact both materials with each other. Preferably, this contact is conducted in the presence of a diluent.

Diluents usable in this case include; aliphatic hydrocarbons such as pentane, hexane, heptane, and octane; aromatic hydrocarbons such as benzene, toluene, and xylene; alicyclic hydrocarbons such as cyclohexane and cyclopentane; and halogenated hydrocarbons such as 1,2-dichloroethane and monochlorobenzene. Of these diluents, preferred are aromatic hydrocarbons and halogenated hydrocarbons.

The diluent is used in an amount of 0.1 to 1000 ml, preferably 1 to 100 ml, per 1 g of the solid product. The treatment temperature is from −50° to 150° C., preferably from 0° to 120° C. The treatment period is at least 10 minutes, preferably from 30 minutes to 3 hours. The treated solid is separated from the liquid, and washed several times with an inert liquid hydrocarbon. Thus, an ester-treated solid is obtained.

The next treatment of the ester-treated solid with a mixture of the ether compound and titanium tetrachloride is preferably carried out in a slurry state. Suitable media for this slurrying include the abovementioned aliphatic hydrocarbons, aromatic hydrocarbons, alicyclic hydrocarbons, and halogenated hydrocarbons. In particular, the above aromatic hydrocarbons and halogenated hydrocarbons are preferable.

The solid concentration in the slurry is from 0.05 to 0.5 g, preferably from 0.1 to 0.3 g, per ml of the medium.

The reaction temperature is from 30° to 150° C., preferably from 45° to 120° C., particularly preferably from 60° to 100° C. While there is no particular restriction on the reaction period, generally preferred periods are from 30 minutes to 6 hours.

As to the manner of adding the ether compound and titanium chloride to the ester-treated solid, it is preferable to add a mixture of an ether compound and titanium tetrachloride prepared previously or to add these compounds at the same time.

The reaction with a mixture of an ether compound and titanium tetrachloride is desirably conducted at least twice from the viewpoint of the catalytic activity and stereospecificity of the catalyst system.

The ether compound is used in an amount of 0.1 to 100 moles, preferably 0.5 to 50 moles, particularly preferably 1 to 20 moles, per mole of titanium atoms contained in the solid product.

Titanium tetrachloride is used in an amount of 1 to 1000 moles, preferably 3 to 500 moles, particularly preferably 10 to 300 moles, per mole of titanium atoms contained in the solid product. The amount of titanium tetrachloride to be added per mole of the ether compound is from 1 to 100 moles, preferably from 1.5 to 75 moles, particularly preferably from 2 to 50 moles.

The solid catalyst component containing a trivalent titanium compound, obtained in the above described manner, is separated from the liquid, and washed several times with an inner liquid hydrocarbon such as hexane or heptane, thereafter being used in polymerization.

It is preferable in view of the catalytic activity and stereospecificity of the catalyst system that the solid separated from the liquid be washed at least once with an aromatic hydrocarbon such as toluene or xylene or with a halogenated hydrocarbon such as monochlorobenzene at a temperature of 50 to 120° C and further washed several times with an aliphatic hydrocarbon such as hexane, thereafter being used in polymerization.

(B) Preparation of sterically hindered aluminum amide

Alkylaluminum amide compounds are generally synthesized from alkylaluminum compounds and primary or secondary amine compounds by the following reaction:

$AlR_3 + RNH_2 \rightarrow RNHAlR_2 + RH \uparrow$ or

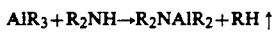

$AlR_3 + R_2NH \rightarrow R_2NAlR_2 + RH \uparrow$

[Peone Gazz/ Chim. Ital. 55, 306 (1925), Weiss and C. J. Marsel Aeronautical Research Laboratory Report, ARL, 124, Dec. (1961)]

The sterically hindered aluminum amide compound used in the present invention, that is, component (B) represented by the general formula

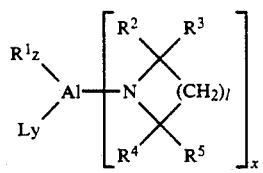
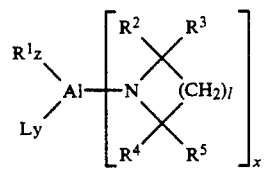

wherein, $R^1$ through $R^5$ are each a hydrocarbon group of 1 to 20 carbon atoms, L is an alkoxy group of 1 to 20 carbon atoms or halogen, l is 2 or 3, x is defined by $0<x<1$, y is defined by $0 \leqq y<3$, and z is defined by $0<z<3$, with the proviso that $x+y+z=3$, is synthesized from the corresponding amine compound and alkylaluminum.

Examples of the amine compound used to synthesize the sterically hindered aluminum amide include 2,5-diisopropylpyrrolidine, 2,5-di-tert-butylpyrrolidine, 2,6-diisopropylpiperidine, 2,6-di-tert-butylpiperidine, 2,2,5,5-tetramethylpyrrolidine, and 2,2,6,6-tetramethylpiperidine. Of these compounds, preferred are 2,2,5,5-tetramethylpyrrolidine and 2,2,6,6-tetramethylpiperidine.

The alkylaluminum compound used for synthesizing the sterically hindered aluminum amide is a trialkylaluminum and/or a dialkylaluminum hydride represented by the general formulae $R^{19}$Al and/or $R^{20}$AlH, respectively, wherein $R^{19}$ and $R^{20}$ are each a hydrocarbon group of 1 to 20 carbon atoms.

Such alkylaluminum compounds include, for example, trimethylaluminum, triethylaluminum, triisobutylaluminum, trihexylaluminum, trioctylaluminum, tripropyl-aluminum, tributylaluminum, tri(2-methylpentyl)aluminum, diethylaluminum hydride, and diisobutylaluminum hydride. Of these compounds, preferred are triisobutylaluminum and diethylaluminum hydride and particularly preferred is triethylaluminum.

To react the organoaluminum compound with the amine compound, there are the order of adding the former compound to the latter and the order of adding the latter compound to the former. Either order is acceptable.

The amine compound and the organoaluminum compound are used preferably with themselves dissolved or diluted with a suitable solvent.

Such solvents include; aliphatic hydrocarbons, e.g. hexane, heptane, octane, and decane; aromatic hydrocarbons, e.g. toluene and xylene; and alicyclic hydrocarbons, e.g. cyclohexane and methylcyclohexane.

There is no particular restriction on the reaction temperature or period, that is to say, the synthesis can be carried out under any of customary reaction conditions, provided that these conditions result in the complete disappearance of the infrared absorption assigned to the stretching vibration of the N-H bond of the amine compound used. Generally, the synthesis can be accomplished at temperatures of 0° to 90° C. for periods of 30 minutes to 4 hours.

The aluminum amide compound having the intended average composition can be obtained by mixing an aluminum amide of optional composition with trialkylaluminum, alkylaluminum halide, or alkylaluminum alkoxide.

Aluminum amide compounds represented by the general formula synthesized by the above stated methods have x values in the range of $0<x<1$, preferably $0.0001 \leqq x \leqq 0.9$, particularly preferably $0.001 \leqq x \leqq 0.7$.

The amount of component (B) to be used can be chosen from the wide range of 1 to 100,000 moles per mole of titanium atoms contained in component (A), though that amount ranges preferably from 5 to 10,000 moles, particularly preferably from 10 to 1,000 moles.

(C) Polymerization of α-olefin

There is no particular restriction on the manner of charging the catalyst components into the polymerization reactor except that the components should be charged in the moisture-free state under an atmosphere of inert gas such as nitrogen or argon.

While the polymerization can be carried out at temperatures ranging from $-30°$ to 200° C., polymerization temperatures lower than 0° C. decrease the rate of polymerization and temperatures above 100° C. give no polymer having high stereoregularity. Hence, the polymerization is normally conducted in the range of 0° to 100° C. There is no particular restriction on the polymerization pressure, but about 3- to 100-atm. polymerization pressures are preferable in the industrial and economical aspects. The polymerization can be operated either continuously or batchwise according to any of the techniques of slurry polymerization employing an inert hydrocarbon medium such as propane, butane, pentane, hexane, heptane, or octane, liquid-phase polymerization using no solvent and gas-phase polymerization.

α-Olefins polymerizable advantageously according to the present invention are those of at least 3 carbon atoms including, for example, propylene, butene-1, pentene-1, hexene-1, 3-methyl-pentene-1, 4-methyl-pentene-1, and decene-1, though not limited to these compounds. According to the present invention, either homopolymerization or copolymerization (including copolymerization with ethylene) is possible.

In the copolymerization, a copolymer can be obtained by contacting two or more olefins in mixed form with the present catalyst system.

A chain transfer agent such as hydrogen can be added for the purpose of controlling the molecular weight of polymer.

The present invention is illustrated in more detail with reference to the following examples, which, however, put no restriction on the scope of the invention.

The valences of titanium compounds in the example were determined from measuring polarograms thereof.

| Conditions of polarogram measurement | |
|---|---|
| Instrument: | Polarographic Analyzer P-1100 (supplied by Yanagimoto Seisakusho Co., Ltd.) |
| Specimen: | Prepared by dissolving about 70 mg of a solid catalyst sample in 30 ml of a base liquid composed of a |

| Conditions of polarogram measurement | |
|---|---|
| | 1.5 M aqueous solution of tartaric acid and 1-N sulfuric acid. |
| Measurement method: | Direct current method |
| Measurement of α-olefin content: | The content of ethylene or α-olefin in the copolymer is determined according to an absolute calibration curve method from respective characteristic band of ethylene and α-olefin using ultrared spectrophotometer (JASCO A-302, manufactured by NIPPON BUNKO KOGYO). |

EXAMPLE 1

(A) Preparation of organomagnesium compound

A 1-liter flask equipped with a stirrer, reflux condenser, dropping funnel, and thermometer was flushed with argon, and 32.0 g metallic magnesium in the form of thin turnings was put into the flask. In the dropping funnel were fed 120 g of butyl chloride and 500 ml of dibutyl ether, and 30 ml of this mixture was dropped on the magnesium in the flask to initiate reaction. Thereafter the remainder of the butyl chloride-dibutyl ether mixture was dropped over 4 hours at 50° C., and the reaction was continued further for 1 hour at 60° C. Then the reaction product solution was cooled to room temperature, and the solid matter was filtered off.

The concentration of butylmagnesium chloride in the filtrate (the solvent: dibutyl ether) was determined by hydrolyzing a sample of the filtrate with 1-N sulfuric acid, followed by back titration with 1-N aqueous sodium hydroxide (phenolphthalein was used as an indicator). The found concentration of butylmagnesium chloride was 2.2 moles/l.

(B) Preparation of solid product

A 500-ml flask equipped with a stirrer and a dropping funnel was flushed with argon, and 300 ml of hepatane, 4.1 g (12.1 mmoles) of tetrabutoxytitanium, and 42.9 g (206 mmoles) of tetraethoxysilane were put into the flask and formed into a uniform solution. Then, 100 ml of the organomagnesium compound prepared in (A) was added dropwise from the dropping funnel over 2 hours while keeping the temperature of the flask contents at 5° C. The resulting mixture was further stirred for 1 hour at room temperature, and the formed precipitate was separated from the liquid at room temperature, washed three times with 300-ml portions of heptane, and dried under reduced pressure, giving 32.0 g of a brown solid product. Titanium atoms contained in the solid product were found by polarography to have a valence of 3.

The solid product was found to contain 1.7 wt. % of trivalent titanium atoms, 18.2 wt. % of magnesium atoms, 2.2 wt. % of silicon atoms, 0.8 wt. % of dibutyl ether, 33.5 wt. % of ethoxy groups, and 2.4 wt. % of butoxy groups.

This solid product showed no distinct diffraction in the wide-angle X-ray (Cu-Kα ray) diffraction pattern, hence being noncrystalline.

(C) Preparation of ester-treated solid

A 200-ml flask was flushed with argon, and 15 g of the solid product prepared in (B) and 90 ml toluene were charged in the flask and 2.7 ml of diisobutyl phthalate was added and reacted with the solid product at 80° C. for 1 hour.

The resulting solid was separated from the liquid, and washed three times with 120-ml portions of heptane. The ester-treated solid obtained was found to contain 6.2 wt. % of phthalate.

(D) Preparation of solid catalyst component

After the washing in above (C) had been finished, 5.6 ml (32.6 mmoles) of dibutyl ether and 49.3 ml (450 mmoles) of titanium tetrachloride with 90 ml of toluene were added to the flask contents and reacted with the solid at 80° C. for 1 hour. Thereafter the resulting solid was separated from the liquid at 80° C., washed twice with 90-ml of toluene at the same temperature, and further washed four times with 120-ml of heptane at room temperature.

The above treatment with the mixture of dibutyl ether and titanium tetrachloride was repeated once more under the same conditions, yielding 13.0 g of a solid catalyst component having a yellow-soil color.

Titanium atoms contained in this solid catalyst component were found by polarography to have a valence of 3.

The solid catalyst component was found to contain 1.8 wt. % of titanium atoms, 21.1 wt. % of magnesium atoms, 0.2 wt. % of silicon atoms, 0.3 wt. % of butoxy groups, 1.1 wt. % of ethoxy groups, 6.2 wt. % of phthalate, 0.2 wt. % of diisoamylether, and 66.7 wt. % of chlorine.

(E) Preparation of aluminum amide compound

A 300-ml of flask equipped with a stirrer and a dropping funnel was flushed with argon, and 100 ml of a solution consisting of 76.6 ml of toluene and 23.4 ml (171 mmoles) of triethylaluminum was charged into the flask. Then, 100 ml of a solution consisting of 91.3 ml of toluene and 8.7 ml (51.3 mmoles) of 2,2,6,6-tetramethylpiperidine was added dropwise from the dropping funnel in 10 minutes while keeping the temperature of the flask contents at 80° C. The resulting mixture was further stirred for 4 hours at 80° C., yielding an aluminum amide compound having an average composition represented by

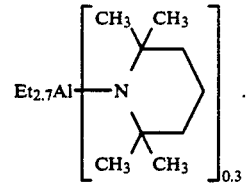

Infrared spectographic analysis confirmed that the absorption at 3310 cm$^{-1}$ assigned to the NH stretching vibration disappeared after completion of the reaction and GC-MS analysis confirmed that the gas evolving during the reaction was ethane.

(F) Polymerization of propylene

A 3-liter autoclave of the mechanical agitation type was flushed with argon, and charged with 10.8 mg of the solid catalyst component prepared in above (D), 26.3 mmoles of the aluminum amide prepared in above (E) having the average composition:

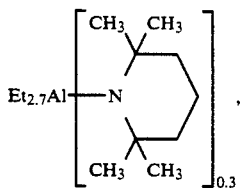

and 780 g of liquefied propylene.

The temperature of the autoclave contents was kept at 80° C. for 2 hours while stirring to finish the polymerization. Then the excess propylene was discharged, and the product was dried for one day, to yield 356 g of polypropylene. Accordingly, the yield (g) of polypropylene per 1 g of the solid catalyst component (PP/cat) (hereinafter this abbreviation applies) was 33,000.

The content of atactic polymer (hereinafter abbreviated as CXS) in the obtained polypropylene was 2.5 wt. %. The CXS is defined as the content of polymer soluble in xylene at 20° C.

EXAMPLE 2

Propylene was polymerized according to the procedure of (F) of Example 1 but using 11.4 mg of the solid catalyst component prepared in (D) of Example 1 and 26.3 mmoles of an aluminum amide compound having the average composition

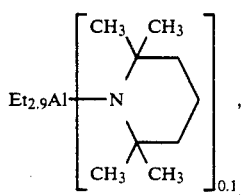

yielding 345 g of polypropylene. PP/cat=30,300 accordingly and CXS=2.6 wt. %.

EXAMPLE 3

Propylene was polymerized according to the procedure of (F) of Example 1 but using 5.1 mg of the solid catalyst component prepared in (D) of Example 1 and 26.3 mmoles of an aluminum amide having the average composition,

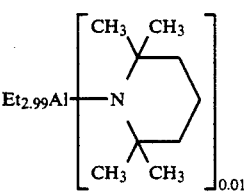

yielding 176 g of polypropylene. PP/cat=35,000 accordingly and CXS=2.8 wt. %.

EXAMPLE 4

Propylene was polymerized according to the procedure of (F) of Example 1 but using 6.4 mg of the solid catalyst component prepared in (D) of Example 1 and 26.3 mmoles of an aluminum amide compound having the average composition

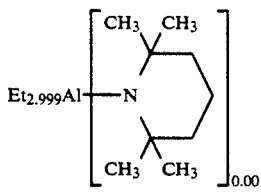

yielding 274 g of polypropylene. PP/cat=42,800 accordingly and CXS=2.9 wt. %.

EXAMPLE 5

Propylene was polymerized according to the procedure of (F) of Example 1 but using 5.6 mg of the solid catalyst component prepared in (D) of Example 1 and 7.8 mmoles of an aluminum amide compound having the average composition

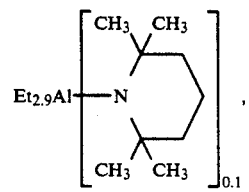

yielding 258 g of polypropylene. PP/cat=46,000 accordingly and CXS=3.1 wt. %.

EXAMPLE 6

Propylene was polymerized according to the procedure of (F) of Example 1 but using 5.1 mg of the solid catalyst component prepared in (D) of Example 1 and 7.8 mmoles of an aluminum amide compound having the average composition

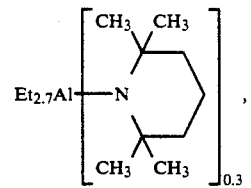

yielding 215 g of polypropylene. PP/cat=42,300 accordingly and CXS=2.8 wt. %.

EXAMPLE 7

Propylene was polymerized according to the procedure of (F) of Example 1 but using 6.3 mg of the solid catalyst component prepared in (D) of Example 1 and 26.8 mmoles of an aluminum amide having the average composition

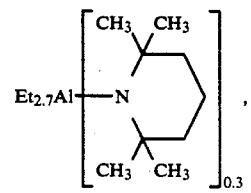

yielding 176 g of polypropylene. PP/cat=28,000 accordingly and CXS=3.2 wt. %.

Comparative Example 1

Propylene was polymerized according to the procedure of (F) of Example 1 but using 10.2 mg of the solid catalyst component prepared in Example 1 and 26.3 mmoles of an aluminum amide compound having the average composition

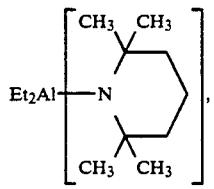

to yield 197 g of polypropylene. PP/cat=19,300 accordingly and CXS=2.8 wt. %.

Comparative Example 2

Propylene was polymerized according to the procedure of (F) of Example 1 except that no aluminum amide compound was used and 26.8 mmoles of triethylaluminum, 0.78 mmole of 2,2,6,6-tetramethylpiperidine, and 6.6 mg of the solid catalyst component prepared in Example 1 were charged in that order in the autoclave, thereby yielding 152 g of polypropylene. PP/cat=23,000 accordingly and CXS =3.5 wt. %.

Comparative Example 3

Propylene was polymerized according to the procedure of (F) of Example 1 but using 6.6 mg of the solid catalyst component prepared in Example 1 and 26.3 mmoles of an aluminum amide having the average composition

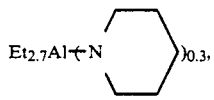

to yield 66 g of polypropylene. PP/cat=11,000 accordingly and CXS=21.6 wt. %.

Comparative Example 4

Propylene was polymerized according to the procedure of (F) of Example 1 but using 14.6 mg of the solid catalyst component prepared in Example 1 and 26.3 mmoles of an aluminum amide compound having the average composition $Et_{2.7}Al$—$NPh_2)_{0.3}$, yielding 141 g of polypropylene. PP/cat=9,660 accordingly and CXS=23.0 wt. %.

Comparative Example 5

Propylene was polymerized according to the procedure of (F) of Example 1 except that 5.1 mg of the solid catalyst component prepared in Example 1 and 7.8 mmoles of 2,2,6,6-tetramethylpiperidine were previously brought into contact with each other and then charged into the autoclave and 26.3 mmoles of triethylaluminum was then added, thereby yielding 59 g of polypropylene. PP/cat=11,600 accordingly and CXS =4.1 wt. %.

EXAMPLE 8

A 3-liter autoclave of the mechanical agitation type was flushed with argon, and charged with 15.6 mg of the solid catalyst component prepared in Example 1-(D), 2.2 mmoles of the aluminum amide compound prepared in Example 1-(E) having the average composition:

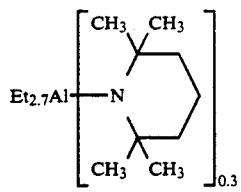

and 1000 ml of 4-methyl-1-pentene.

The temperature of the autoclave contents was kept at 70° C. for 1 hour while stirring, and then 50 ml of isobutylalcohol was added to finish the polymerization. Then the slurry formed was filtered by glass-filter (G-3) to separate the polymer formed, and the polymer was washed with 1000 ml of dry n-heptane and dried at 80° C. for 4 hours under reduced pressure to yield 229.7 g of poly-4-methyl-pentene-1 powder. The filtrate and washing liquid were subjected to evaporation to yield 11.5 g of heptane-soluble polymer.

The ratio of heptane-insoluble portion [(hereinafter abbreviated to HIP(wt. %))] contained in the whole polymer was 95.2 wt. %, and polymer yield per 1 g of solid catalyst component (hereinafter abbreviated to PMP/cat) was 15,460 g/g.

Comparative Example 6

4-Methyl-1-pentene was polymerized according to the procedure of Example 8 except that there was used aluminum amide compound having the average composition

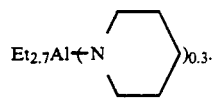

There were obtained HIP(%)=83.5 and PMP/cat=2113 g/g.

EXAMPLE 9

Copolymerization of 4-methyl-1-pentene and 1-decene

A 3-liter autoclave of the mechanical agitation type was flushed with argon, and charged with 15.3 mg of the solid catalyst component prepared in Example 1-(D), 2.2 mmoles of the aluminum amide prepared in Example 1-(E) having the average composition:

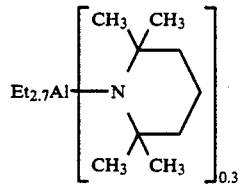

1000 ml of 4-methyl-1-pentene and 25 ml of 1-decene.

The temperature of the autoclave contents was raised to 60° C. to initiate polymerization and polymerization was carried out while supplying 1-decene in a rate of 5 ml/hour over 2.5 hours while stirring, and then 50 ml of i-butylalcohol was added to finish the polymerization. Then the slurry formed was filtered by glass-filter (G-3) to separate the polymer formed, and the polymer was washed with 1000 ml of dry n-heptane and dried for 4 hours under reduced pressure to yield 286.3 g of copolymer powder of 4-methylpentene-1 and 1-decene. The filtrate and washing liquid were subjected to evaporation to yield 16.6 g of solvent-soluble polymer. HIP(%)=94.5 and PMP/cat=19,800 g/g.

As described hereinbefore, the use of the catalyst system of the present invention achieves the following effects:

(1) Since the catalytic activity is very high per one gram of the solid catalyst component and per one gram atom of titanium atoms contained therein, the contents of halogen and titanium atoms, which relate intimately to the coloration, stability and corrosiveness of the parent α-olefin polymer, in the product polymer can be reduced extremely without removing the catalyst residue particularly. That is, any facility for catalyst residue removal becomes unnecessary and production costs for α-olefin polymers can be reduced.

(2) α-olefin polymers having very high stereoregularity can be produced. That is, since the amount of amorphous polymer formed incidentally is extremely limited, α-olefin polymers excellent in mechanical properties are producible without removing the amorphous polymer.

(3) Since the low-stereoregular polymer soluble in the polymerization medium forms a very little, none of such process problems arise as the adhesion of polymer to reactors, pipes, flask hoppers, etc. and in addition the raw material monomer can be utilized effectively.

What is claimed is:

1. A catalyst system for producing an α-olefin polymer which consists of
   (A) a solid catalyst component containing at least titanium, magnesium, halogen, and electron donor, which is obtained by
   (i) reducing a titanium compound represented by the general formula $Ti(OR^6)_nX_{4-n}$ wherein $R^6$ denotes a hydrocarbon group of 1 to 20 carbon atoms, X denotes halogen, and n is a number defined by $0<n\leq 4$, with an organomagnesium compound in the presence of an organo-silicon compound having one or more Si-O bonds, and
   (ii) treating the resulting solid product with an ester compound and a mixture of an ether compound and titanium tetrachloride, and
   (B) a sterically hindered aluminum amide compound represented by the general formula

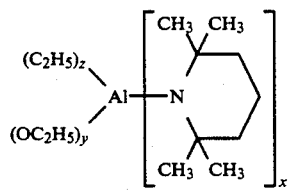

wherein x is defined by $0.001 \leq x \leq 0.7$, y is defined by $0 \leq y < 3$, and z is defined by $0 < z < 3$ with the proviso that $x+y+z=3$.

2. A catalyst system according to claim 1, wherein in the titanium compound represented by the general formula $Ti(OR^6)_nX_{4-n}$, $R^6$ is a straight chain alkyl group having 2 to 18 carbon atoms.

3. A catalyst system according to claim 1, wherein in the titanium compound represented by the general formula $Ti(OR^6)_nX_{4-n}$, X is chlorine.

4. A catalyst system according to claim 1 wherein in the titanium compound represented by the general formula $Ti(OR^6)_nX_{4-n}$, n is $2\leq n\leq 4$.

5. A catalyst system according to claim 1, wherein the organomagnesium compound is a Grignard compound represented by the general formula $R^{15}MgX$ (wherein $R^{15}$ represents a hydrocarbon group of 1 to 20 carbon atoms and X is halogen) or a dialkylmagnesium compound or diarylmagnesium compound represented by the general formula $R^{16}R^{17}Mg$ (wherein $R^{16}$ and $R^{17}$ each denotes a hydrocarbon group of 1 to 20 carbon atoms), the $R^{15}$, $R^{16}$ and $R^{17}$ are same or different.

6. A catalyst system according to claim 5, wherein the $R^{15}$, $R^{16}$ and $R^{17}$ are each represents an alkyl group, aryl group, aralkyl group or alkenyl group of 1 to 20 carbon atoms.

7. A catalyst system according to claim 1, wherein the organosilicon compound is one represented by the general formula;

$$Si(OR^9)_m R^{10}_{4-m}$$

$$R^{11}(R^{12}_2 SiO)_p SiR^{13}_3, \text{ or}$$

$$(R^{14}_2 SiO)_q$$

wherein $R^9$ denotes a hydrocarbon group of 1 to 20 carbon atoms, $R^{10}$, $R^{11}$, $R^{12}$, $R^{13}$ and $R^{14}$ each denotes a hydrocarbon group of 1 to 20 carbon atoms or hydrogen, m is defined by $0<m\leq 4$, p is an integer of 1 to 1000 and q is an integer of 2 to 1000.

8. A catalyst system according to claim 1, wherein the ester compound is a mono- or multi-valent carboxylic acid ester.

9. A catalyst system according to claim 8, wherein the carboxylic acid ester is aliphatic carboxylic ester, olefinic carboxylic ester, alicyclic carboxylic ester or aromatic carboxylic ester.

10. A catalyst system according to claim 1, wherein the ether compound is a dialkyl ether.

11. A catalyst system according to claim 10, wherein the dialkyl ether is diethyl ether, dipropyl ether, diisopropyl ether, diisoamyl ether or dibutyl ether.

12. A catalyst system according to claim 1, wherein the organosilicon compound is used in term of the ratio of the sum of titanium atoms and silicone atoms to magnesium atoms from 0.1 to 10.

13. A catalyst system according to claim 1, wherein the organosilicon compound is used in terms of the ratio of silicone atoms therein to titanium atoms in the titanium compound from 1 to 50.

14. A catalyst system according to claim 1, wherein the ester compound is used in an amount of 0.1 to 50 moles per mole of titanium atoms in the solid product, and from 0.01 to 1.0 mole per mole of magnesium atoms contained in the solid product.

15. A catalyst system according to claim 1, wherein the ether compound is used in an amount of 0.1 to 100 moles per mole of titanium atoms contained in the solid product.

16. A catalyst system according to claim 1, wherein the titanium compound is used in an amount of 1 to 1000 moles per mole of titanium atoms contained in the solid product.

17. A catalyst system according to claim 1, wherein the sterically hindered aluminum amide is used in an amount of from 1 to 100,000 moles per mole of titanium atoms contained in component (A).

18. A catalyst system according to claim 1, wherein the treatment of ester-treated product with an ether compound and titanium tetrachloride is carried out in a slurry state.

* * * * *